(12) United States Patent
Zhuyan (10) Patent No.: US 7,664,141 B2
(45) Date of Patent: Feb. 16, 2010

(54) METHOD AND DEVICE FOR DECREASING A TRANSMISSION DELAY IN A MULTI-CHANNEL DATA TRANSMISSION

(75) Inventor: Zhao Zhuyan, Beijing (CN)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/583,754

(22) PCT Filed: Dec. 22, 2003

(86) PCT No.: PCT/IB03/06124

§ 371 (c)(1),
(2), (4) Date: Jun. 2, 2008

(87) PCT Pub. No.: WO2005/069529

PCT Pub. Date: Jul. 28, 2005

(65) Prior Publication Data

US 2008/0304430 A1 Dec. 11, 2008

(51) Int. Cl.
*H04J 3/18* (2006.01)
*H04W 72/00* (2006.01)

(52) U.S. Cl. .............. 370/477; 370/464; 370/465; 370/468; 370/229; 370/235; 455/452.1; 455/452.2

(58) Field of Classification Search ........... 370/229, 370/235, 236; 455/403, 422.1, 436, 450, 455/452.1, 452.2
See application file for complete search history.

(56) References Cited

U.S. PATENT DOCUMENTS

| 6,175,560 | B1 | 1/2001 | Bhagalia et al. | |
|---|---|---|---|---|
| 6,353,617 | B1 * | 3/2002 | Cadd et al. | 370/445 |
| 2002/0159410 | A1 * | 10/2002 | Odenwalder et al. | 370/329 |
| 2002/0177447 | A1 * | 11/2002 | Walton et al. | 455/452 |
| 2003/0012165 | A1 | 1/2003 | Soomro et al. | |
| 2003/0202492 | A1 * | 10/2003 | Akella et al. | 370/335 |
| 2004/0110504 | A1 * | 6/2004 | Kenagy et al. | 455/436 |

FOREIGN PATENT DOCUMENTS

| WO | WO/0203600 | 1/2002 |
|---|---|---|
| WO | WO/0217548 | 2/2002 |
| WO | WO/03077464 | 9/2003 |
| WO | WO/03105394 | 12/2003 |

* cited by examiner

*Primary Examiner*—Ricky Ngo
*Assistant Examiner*—Paul Masur
(74) *Attorney, Agent, or Firm*—Hollingsworth & Funk, LLC (57) ABSTRACT

The present invention relates to a method and a device to improve the transmission characteristics of physical layer (PHY) hybrid automated repeat request (HARD) in multi subchannel frequency division duplex (FDD) links. The present invention provides a method for decreasing a transmission delay in a multi-sub-channel data transmission of physical layer frames using hybrid automated repeat request with acknowledgement signaling, wherein said method comprises: determining, if no physical layer frame needs to be transmitted in a provided sub channel, determining, if there is a physical layer frame of another sub-channel with pending acknowledgement, selecting said physical layer frame with pending acknowledgement, if no physical layer frame needs to be transmitted in the provided sub-channel, and transmitting said selected frame in said provided sub-channel. The method can also or additionally comprise determining a threshold number, based on the number of sub-channels in said multi-sub-channel data transmission, determining the number of physical layer frames to be transmitted in all sub-channels, and controlling the transmission power of the transmission of the physical layer frames, on the basis of the relationship between said threshold number and said determined number of physical layer frame.

13 Claims, 7 Drawing Sheets

METHOD AND DEVICE FOR DECREASING A TRANSMISSION DELAY IN A MULTI-CHANNEL DATA TRANSMISSION

FIELD OF THE INVENTION

The present invention relates to improvements of physical layer (PHY) hybrid automated repeat request (HARQ) in multi sub-channel frequency division duplex (FDD) links. More specifically the invention relates to improved Hybrid Automated Repeat Request (HARQ) procedures in Universal Terrestrial Radio Access (UTRA) in Frequency Division Duplex (FDD) enhanced links. More specifically, the present invention relates to the uplink transmissions from user equipment (UE) to at least one base station (B-node) in this environment.

BACKGROUND

The technical background is for example defined in the technical report of the 3rd Generation Partnership Project (3GPP) TR 25.896 V0.3.1 (2003-05).

Hybrid ARQ (H-ARQ)

H-ARQ is an implicit link adaptation technique. In H-ARQ, link layer acknowledgements are used for re-transmission decisions. There are different schemes for implementing H-ARQ-Chase combining, rate-compatible punctured turbo-codes and incremental redundancy. Incremental redundancy or H-ARQ-type-II is another implementation of the H-ARQ technique wherein instead of sending simple repeats of the entire coded packet, additional redundant information is incrementally transmitted if the decoding fails on the first attempt.

H-ARQ-type-III also belongs to the class of incremental redundancy ARQ schemes. However, with H-ARQ-type-III, each retransmission is self-decodable which is not the case with H-ARQ-type II. Chase combining (also called H-ARQ-type-III with one redundancy version) involves the retransmission by the transmitter of the same coded data packet. The decoder at the receiver combines these multiple copies of the transmitted packet weighted by the received signal to noise ratio (SNR). Diversity (time) gain is thus obtained. In the H-ARQ-type-III with multiple redundancy version different puncture bits are used in each retransmission.

The choice of H-ARQ mechanism however is important. Window based Selective Repeat (SR) is a common type of ARQ protocol employed by different systems including RLC R99. SR is generally insensitive to delay and has the favorable property of repeating only those frames that have been received in error. To accomplish this feat, the SR ARQ transmitter must employ a sequence number to identify each frame it sends. SR may fully utilize the available channel capacity by ensuring that the maximum frame sequence number (MBSN) exceeds the number of frames transmitted in one round trip feedback delay. The greater the feedback delay the larger the maximum sequence number must be. However, when Hybrid ARQ is partnered with SR, several difficulties are seen.

The memory requirements to the user equipment (UE) are high. The mobile must store soft samples for each transmission of a frame. The MSBN frames may be in transit at any time. A large MBSN requires significant storage in the UE adding to the costs of the unit.

Hybrid ARQ requires the receiver to reliably determine the sequence number of each transmission. Unlike conventional ARQ, every frame is used even if there is an error in the data. In addition, the sequence information must be very reliable to overcome whatever channel conditions have induced errors in the data. Typically a separate, strong code must be used to encode the sequence information, effectively multiplying the bandwidth required for signaling Stop-and-wait is one of the simplest forms of ARQ requiring very little overhead. In stop-and-wait, the transmitter operates on the current frame until the frame has been received successfully. Protocol correctness is ensured with a simple one-bit sequence number that identifies the current or the next frame. As a result, the control overhead is minimal. Acknowledgement overhead is also minimal, as the indication of a successful/unsuccessful decoding (using acknowledged/not-acknowledged i.e. ACK, NACK, etc) may be signaled concisely with a single bit. Furthermore, because only a single frame is in transit at a time, memory requirements at the UE are also minimized. Therefore, HARQ using a stop-and-wait mechanism offers significant improvements by reducing the overall bandwidth required for signaling and the UE memory.

However, one major drawback exists: acknowledgements are not instantaneous and therefore after every transmission, the transmitter must wait to receive the acknowledgement prior to transmitting the next frame. This is a well-known problem with stop-and-wait ARQ. In the interim, the channel remains idle and system capacity goes wasted. In a slotted system, the feedback delay will waste at least half the system capacity while the transmitter is waiting for acknowledgments. As a result, at least every other timeslot must go idle even on an error free channel.

N-channel stop-and-wait Hybrid ARQ offers a solution by paralleling the stop-and-wait protocol and in effect running a separate instantiation of the Hybrid ARQ protocol when the channel is idle. As a result no system capacity goes wasted since one instance of the algorithm communicates a data frame on the forward link at the same time that the other communicates an acknowledgment on the reverse link. However, the receiver has to store a number of N frames for this scheme.

The physical layer (PHY) HARQ is being studied as a potential technique to support UTRA FDD Enhanced uplink. PHY HARQ allows a reduction of the transmission delay and an improvement of the system capacity. A user equipment (UE) communicates with one or more base stations (Node Bs), and the data packets (RLC SDU) from the UE are send to Node B frame by frame over an uplink. If a physical layer (PHY) frame from the UE is received correctly by a Node B which is connected with the UE, the Node B will send back an acknowledged (ACK) signaling to the UE over a downlink, and the UE will then transmit a new PHY frame. If the PHY frame is not received correctly by the Node B, a not-acknowledged (NACK) signaling will be sent to the UE, and the UE will retransmit the PHY frame again. PHY HARQ can be implemented by using an N-channel Stop-And-Wait (SAW) HARQ mechanism, in which the PHY frames are sent in N different continue time-multiplex channels. Each of the N channels has an independent HARQ processing, in other words, the error PHY frame only can be retransmitted at the next frame of the same channel which transmitted the original packet. Under such conditions, the PHY frame can be transmitted continuously, and system does not waste time to wait for the ACK/NACK signaling. Several key factors will decide about the selection of the sub-channel number, such as transmission delay, processing times of the UE and the Node B, the Node B buffer size as well as ACK/NACK signaling length. In the case of the sub-channel number is too small, such as 2, the delay time between original transmission and retransmission is short. However, in this case, UE and Node B have to process a PHY frame more quickly, and ACK/NACK singling transmission power may be higher, since short length ACK/NACK signaling has not enough processing gain. To avoid the problems described above, the sub-channel number is always selected 4 or 5 to insure that Node B and UE have enough processing time when e.g. a 10 millisecond (ms) transmission time interval (TTI) is used.

When a data packet (RLC SDU) needs to be transmitted in a physical layer (PHY) channel, it needs to be segmented, encapsulated step by step by the radio link control (RLC) layer and the media access control (MAC) layer at the transmitter side. The receiver receives the PHY frames carrying the information of the data packets (RLC SDU). The receiver RLC layer will deliver the data packet (RLC SDU) to the higher layer when all PHY frames are received successfully.

Since each physical frame only contains a part of the information of the data block (RLC SDU), any lost or delayed PHY frame will cause a total loss or delay of the data frame (RLC SDU). If any PHY frame is incorrect, under an N-channel SAW HARQ mechanism, the frame will be retransmitted at the next frame in the same sub-channel. If the incorrect frames are the last several frames belong to the data packet (RLC SDU), there it is likely not any other frames carrying information of the data packet (RLC SDU) that need to be transmitted in other sub-channels, when the incorrect frames are transmitted in one or more sub-channels. Thus the continuity of the data packet (RLC SDU) transmission is broken. The probability of the data packet (RLC SDU) with a longer transmission delay time will increase along with the retransmission probability and sub-channel number value N is increasing. This will decrease the transmission efficiency single data packets as well as increase the delay time. It is very harmful to the service of time sensitive transmission of small data packet (RLC SDU).

Under PHY HARQ, the block error rate (BLER) of the first transmission is always equal to 10%~20% to get a HARQ gain. Conventionally, the BLER of the first transmission is same for all PHY frames carrying the information of the data packet (RLC SDU).

All the above approaches for communication and data transfer schemes have in common that they do not provide a solution for the unsatisfactory frame transfer termination characteristics of conventional HARQ techniques.

Therefore, it is desirable to have HARQ techniques that can overcome these problems and that provide improved frame transfer termination characteristics.

SUMMARY

The present invention provides two methods and their respective combination to protect the last several PHY frames in a data transfer thereby eliminating an increased transmission delay due to incorrect ones if the last several PHY frames of a data packet (RLC SDU).

The last several PHY frames of a data packet (RLC SDU) are more important than the other PHY frames of the same data packet in view of the transmission delay. The present invention provides a method and a device to reduce the frame error rate of the last several PHY frames of a data packet (RLC SDU).

According to a first aspect of the present invention, there is provided a method for decreasing a transmission delay in a multi-sub-channel data transmission of physical layer frames using hybrid automated repeat request with acknowledgement signaling.

The method comprises determining, if no physical layer frame needs to be transmitted in a provided sub-channel, determining, if there is a physical layer frame of another sub-channel with pending acknowledgement, selecting said physical layer frame with pending acknowledgement, if no physical layer frame needs to be transmitted in the provided sub-channel, and transmitting said selected frame in said provided sub-channel.

By determining, if no physical layer frame (PHY frame) needs to be transmitted in a provided sub-channel, it is determined if the present sub-channel is free, and would be wasted because there are actually no data to be transferred in this sub-channel. The sub-channel can be regarded as sub-channel timeslot in a frequency division duplex access (FDD). If there is at least one PHY frame present that needs to be transmitted in this sub-channel (or time slot) this frame can be transmitted without any limitation in a conventional manner. Such a frame to be transmitted can be e.g. a previously transmitted unacknowledged frame. There is no frame to be transmitted, if the last transmitted frame has been the last frame in said sub-channel and an acknowledgement signaling of the last transmitted frame has been received.

By determining, if there is a physical layer frame of another sub-channel with pending acknowledgement it can be determined if it is possible that a transmitted frame may have to be repeated or any other additional frames may have to be sent which may cause a HARQ delay. The expression 'pending acknowledgment signals' is used to describe that the acknowledge/not-acknowledge (ACK/NACK) signaling of each of these frames is outstanding i.e. has not yet been received. Thus, it is determined, if there is at least one previously sent frame of another sub-channel that has not yet been acknowledged. If this should be the case it is principally possible that a not-acknowledgement may be received for this PHY frame, which may require an additional sequence of all used sub-channels. This frame is a frame of one of the other sub-channels, as the provided sub-channel is already determined to be free of frames to be sent.

By selecting a physical layer frame with pending acknowledgement, if no physical layer frame needs to be transmitted in the present or actual sub-channel, a retransmission of a frame of another sub-channel may be antedated.

A physical layer frame can only be selected, if and when there is actually at least one physical layer frame of another sub-channel with pending acknowledgement. This has not explicitly been mentioned in the claim to eliminate redundancy.

By finally transmitting said selected frame in the provided sub-channel, a physical layer (PHY) frame is send just in case that an expected acknowledgement of another sub-channel is not going to be received. Thus, a not-acknowledged PHY frame is precautionary send. Thereby, a provided frame is used to send probably redundant data, as a preventive measure, just in case these data may not be redundant because a previously send frame has been corrupted.

In case that only acknowledgement signaling for the selected and additionally transmitted frames are received in the other sub-channels, the sent data where if no avail, but did also no harm expect of the power consumption required for the transmission of said actually redundant frames.

This embodiment eliminates the free or empty frames by repeating the last frames that has been transmitted (but not-acknowledged) in the sub-channels. As the respective frames have not yet been acknowledged, the retransmission of the unacknowledged frames is principally performed without any HARQ technology. That is, a HARQ sequence is terminated by a retransmission of non-HARQ based frames as a precaution, except that the case that original unacknowledged frame has already been an HARQ based frame.

In an example embodiment of the present invention said method further comprises determining, if there are physical layer frames with pending acknowledgement that has been repeated, and selecting only frames with pending acknowledgement that has not been repeated. That is, it is determined, if there are physical layer frames with pending acknowledgement that have been previously selected, and selecting another physical layer frame with pending acknowledgement that has not been previously selected. This can be performed to prevent that the last packet is transmitted over-redundantly. This feature can also be used to automatically limit the number of repetitions of a single frame to prevent that only a single not-acknowledged frame is repeated in all successive sub-channels, while other not-acknowledged frames are not retransmitted at all.

In another example embodiment of the present invention said physical layer frame with pending acknowledgement, is selected, wherein said pending acknowledgement is pending for longer time period than the acknowledgement of the other frames. That is, the physical layer frame with pending acknowledgement is selected that has originally been sent at first in the original sub-channel. In connection with the above referenced non-repetition feature this represents automated repetition of all unacknowledged in the same succession these frames has been sent. Thereby, it can be assured that all presently unacknowledged frames are sent, which can be maximally one less than the absolute number of sub-channels. This selection scheme can be implemented in a very simple manner, which is an advantage. This scheme also has the drawback that the always complete last frames (expect of the one of the sub-channel running empty at first) are repeated.

In yet another example embodiment of the present invention said physical layer frame with pending acknowledgement is selected, wherein said pending acknowledgement is pending for a shorter time period than the acknowledgement of the other frames. Thereby, the physical layer frame with pending acknowledgement is selected that has originally been sent at least.

Thereby the most time critical frame i.e. the frame of which the acknowledgement is to be expected at the latest point in time is sent at first. Thereby it may be assured that the overall transmission time can be minimized in case that the last frames are not transmitted successfully. In connection with the above referenced non-repetition feature this represents an automated repetition of unacknowledged frames in an inverted succession these frames has originally been sent. Thereby, in case that only acknowledgement signaling is received the process can be terminated very fast, i.e. after the half of absolute number of sub-channels that has been sent. This selection scheme can be implemented in a simple manner.

The method may be combined with the above-described embodiment in form of a jump sequence that may select alternately the first and the last transmitted frames.

In another example embodiment of the present invention said physical layer frame with pending acknowledgement, is randomly selected. Thereby a compromise between the previously described approaches for selecting the next frame can be used that may lead to the best results. This requires a random component to perform this selection, resulting in a more complex implementation of the present invention. It is also possible to use an analytic approach comprising analyzing previous acknowledgement patterns searching for the most probable unacknowledged frame. This analytical approach will also result in a kind of random selection in case that there is actually no kind of correlation present.

According to a first aspect of the present invention, there is provided a method for decreasing a transmission delay in a multi-sub-channel data transmission of physical layer frames using hybrid automated repeat request with acknowledgement signaling.

The method comprises determining a threshold number based on the number of sub-channels in said multi-sub-channel data transmission, determining the number of physical layer frames to be transmitted in all sub-channels, and controlling the transmission power of the transmission of the physical layer frames on the basis of the relation between the threshold number and said determined number of physical layer frames.

By determining a threshold number, based on the number of sub-channels in said multi-sub-channel data transmission, the subsequent controlling of the transmission power can be related to the number of actually used sub-channels. In case of a fixed sub-channel number transmission, the threshold number can be predetermined and can be determined by retrieving a respective value in a memory. In case of a variable sub-channel number an algorithm can be used to determine an actual threshold number. The threshold number is preferably an integer value to prevent that the transmission power is to be changed during the transmission of a single frame. In the simplest approach, the threshold number can be selected as the number of used sub-channels, or the number of actually used sub-channels plus one or minus one.

By determining, the number of frames to be transmitted in all sub-channels, the number of frames that can be transmitted subsequently is determined. It is to be noted that it can be sufficient to determine, if said number of frames that can be subsequently transmitted exceeds said threshold number, or exceeds said threshold by a predetermined value. It may not be necessary to determine the absolute or exact number of frames to be transmitted.

By controlling the transmission power of the transmission of the physical layer (PHY) frames, on the basis of the relation between threshold number and said determined number of PHY frames, the error rate of the last several PHY frames of a data packet can be reduced. Thereby, it can be prevented that one of the frames that has been transmitted at the end of a packet is going to be unacknowledged, and that a subsequent sub-channel cycle is required. In contrast to the above-indicated solutions this method is directed to prevent the reception of a not-acknowledgement signal in one of the last transmitted frames.

This example embodiment strives to eliminate the free frames by increasing the transmission power of the last frames to be transmitted in the sub-channels.

In an example embodiment said transmission power for the transmission of the physical layer frames is increased if said threshold number exceeds said determined number of physical layer frames to be transmitted. It is also possible to increase the transmission power if said determined number of physical layer frames equals said threshold number. Both cases can be accommodated by a respective offset added during the determination or generation of the threshold number.

Another example embodiment of the invention subsequently increases the transmission power of the last frames to be transmitted.

In an N-sub-channel system the transmission power can be increased at least with the N−1-last frame, so that in case the last frame with a not-altered transmission power is can be re-transmitted immediately after the last probable safe (because transmitted with a higher transmission power) frame is sent. This retransmitted frame can also be transmitted with an increased transmission power.

Said transmission power can be changed by fixed value or by a relative percentage of the actual used transmission power. In cases such as in universal terrestrial radio access (UTRAN) wherein (enhanced) dedicated physical data channels (DPDCHs) and dedicated physical control channels (DPCCHs) are used, said transmission power can be increased by adjusting upwards the ratio of the transmission power of an (enhanced) dedicated physical data channel to the transmission power of said dedicated physical control channel.

In another example embodiment said method further comprises determining an error rate. Said determined error rate can be used as a basis for determining or generating said threshold number. It is also possible to use a frame error rate to determine of generate said threshold number. Thereby, the power can be increased before the last sequence of sub-channels is encountered. Especially in case of high error rates it is probable that a not-acknowledged signal is received during the transmission of the last frames in the last sub-channel sequence. This can be opposed by increasing the transmission power, before one of the last N-frames in an N-sub-channel transmission mode is transmitted. The error rate can be determined as a block error rate or as a frame error rate or any other suitable error rate.

In yet another example embodiment said method of increasing the transmission power for the transmission of the physical layer frames is also based on said determined error rate or said determined frame error rate. Thereby, the value of the increase of the transmission power can be related to the previously detected error rates. That is method of the present invention is capable of varying the number of frames with an increased transmission power as well as the increase of the transmission power itself as a function of the determined error rate. The error rate may be determined as e.g. the number of unsuccessful transmissions to the number of successful transmissions. The error rate can also be determined as e.g. the number of unsuccessful transmissions to total number of transmissions. It is also possible to use other parameters that are derivable form a HARQ processing.

In another example embodiment of the present invention said method further comprises decreasing the transmission power for the transmission of the frames, if said determined number of physical layer frames to be transmitted exceeds said threshold number. This reduction of the transmission power represents the inversion of the principle used at the beginning of a new transmission. The reduction is to be interpreted as the reduction of the increased transmission power to the status quo, before the transmission power has been increased. This reduction is to be performed only once to prevent that the method automatically reduces the transmission power to zero.

According to another aspect of the present invention a method for decreasing a transmission delay in a multi-sub-channel data transmission of physical layer frames using hybrid automated repeat request with acknowledgement signaling is provided that combines the principles disclosed in the preceding specification. This enables methods that use increased transmission power for transmitting the last frames, followed by a retransmission of frames with pending acknowledgement signals. The retransmission may be performed with an increased transmission power or with a normal (reduced) transmission power.

This combination also enables a method that uses an increased transmission power only for the retransmitted frames with pending acknowledgement signals.

Thus, the methods of the present invention can be optimized for a maximum reliability of the transmission of the last frames, a minimum overall power consumption at minimized retransmission time.

In yet another example embodiment of the present invention said multi-sub-channel data transmission is an uplink of a dedicated transport channel. That is the disclosed method is used in the data transfer from a user equipment (UE) such as e.g. a mobile telephone, a communicator or a mobile computer to (at least one) base station (B-Node) in a universal terrestrial radio access (UTRAN). It is to be mentioned that this embodiment is explicitly to be applied to all disclosed embodiments of the present invention.

According to another aspect of the present invention, a computer program product downloadable from a server for carrying out the method of the preceding description is provided, which comprises program code means for performing all of the steps of the preceding methods when said program is ran on a computer or a network device.

According to yet another aspect of the invention, a computer program product is provided comprising program code means stored on a computer readable medium for carrying out the methods of the preceding description, when said program product is run on a computer or a network device.

According to yet another aspect of the present invention a communication network device is provided that is capable of decreased transmission delay in a multi-sub-channel data transmission of physical layer frames using hybrid automated repeat request with acknowledgement signaling.

The terminal device comprises a processing unit, a storage, a radio interface with a transmitter and a receiver, a first component for determining, if no physical layer frame needs to be transmitted in a provided sub-channel, a second component for determining, if there is a physical layer frame of another sub-channel with pending acknowledgement, a third component for selecting, said physical layer frame with pending acknowledgement, if no physical layer frame needs to be transmitted in the provided sub-channel, and a fourth component for transmitting said selected frame in said provided sub-channel.

In the terminal device said storage is connected to said processing unit. The storage can comprise e.g. a frame out-queue and/or a frame in-queue. Such queues can be provided to accommodate data transfer differences between the processing unit and the radio interface. The storage can store e.g. the number of actually used sub-channels or the number of remaining frames in the transmission queue. It is also possible that the storage stores the number of remaining frames separately for each sub-channel.

The radio interface for the multi-sub-channel data transmission uses hybrid automated repeat request with acknowledgement signaling. Said radio interface is connected to said processing unit and to said storage. Said radio interface comprises a transmitter and a receiver.

The transmitter is configured to send physical layer data frames and control data in a multi sub-channel transmission pattern, for example universal terrestrial radio access (UTRA), such as it is used in universal mobile telephone standard (UMTS). The receiver is configured to receive acknowledgements for data frames, wherein said receiver is configured to receive said acknowledgements for data frames in the same sub-channel said frame has been sent.

Said first component for determining, if no physical layer frame needs to be transmitted in a provided sub-channel, can be implemented by sub-channel specific frame queues. Another implementation can be to use a frame-out queue in combination with a sub-channel number to determine if there is a next frame to be transmitted or not. In case of a received not-acknowledgement signal the last frame transmitted in said sub-channel is to be retransmitted.

The second component for determining, if there is a physical layer frame of another sub-channel with pending acknowledgement, can be similarly be implemented by a transmission frame queue for unacknowledged frames. It is also possible to implement this feature by an improved storage structure in frame transmission data queue. It is also possible to use a dedicated component for monitoring the transmitted frames and the received acknowledgment signaling.

The third component for selecting said physical layer frame with pending acknowledgement, if no physical layer frame needs to be transmitted in the provided sub-channel and if there are any physical layer frames of another sub-channel with pending acknowledgement present. This component can be provided with an algorithm to select e.g. one of said frame with pending acknowledgement, according to a predefined rule, such as described in the part of the specification related to the method of the present invention. It is for example possible to configure this component to always select the first or the last, an arbitrary (e.g. a random) frame of an out data queue storage for frames with pending acknowledgements.

The fourth component for transmitting said selected frame in said provided sub-channel is connected to said radio interface, and to said component for selecting a physical layer frame.

Additionally, said first component said second component said third component and said fourth component are each connected to said radio interface, and said first component is connected to said second component, said second component is connected to said third component, said third component is connected to said fourth component According to yet another aspect, the present invention provides a communication network device capable of decreased transmission delay in a multi-sub-channel data transmission of physical layer frames using hybrid automated repeat request with acknowledgement signaling.

The terminal device comprises a processing unit, a storage, a radio interface with a transmitter and a receiver, a component for determining a threshold number, based on the number of sub-channels in said multi-sub-channel data, a component for determining the number of physical layer frames to be transmitted in all sub-channels, and a component for controlling the transmission power of said transmitter for the transmission of the physical layer frames, in dependence of the relation between said threshold number and said determined number of physical layer frames.

Said storage is connected to said processing unit. The storage can comprise e.g. a frame out-queue and/or a frame in-queue. The storage can store e.g. the number of actually used sub-channels or the number of remaining frames in the transmission queue. It is also possible that the storage stores the number of remaining frames separately for each sub-channel.

The radio interface for multi-sub-channel data transmission is configured to use hybrid automated repeat request with acknowledgement signaling. Said radio interface is connected to said processing unit and to said storage. Said radio interface comprises a transmitter and a receiver. The transmitter is configured to send physical layer data frames and control data in a multi sub-channel transmission pattern, for example universal terrestrial radio access (UTRA), such as it is used in universal mobile telephone standard (UMTS). The receiver is configured to receive acknowledgements for data frames, wherein said receiver is configured to receive said acknowledgements for data frames in the same sub-channel said frame has been sent.

Said component for determining said threshold number, is connected to said radio interface. Said component for determining said threshold number, can also be connected to said to determine e.g. an error rate such as a block error rate or a frame error rate. As already disclosed in the description of the method of the present invention said component for determining said threshold number can use algorithms that are based on based on the currently used number of different sub-channels, said error rates and other parameters that are related to the carrying out of said data frame transfer.

Said component for determining the number of physical layer frames to be transmitted in all sub-channels is also connected to said radio interface. Said component for determining the number of physical layer frames to be transmitted can be implemented by a frame-out data queue provided to store frames for transmission. Such data queues can be provided to accommodate data transfer differences between the processing unit and the radio interface.

Said component for controlling the transmission power of said transmitter for the transmission of the physical layer frames, in dependence of an actual relation between said threshold number and said determined number of physical layer frames, is connected to both of said components for determining and to said radio interface. Due to said connections to said components for determining said component can actually determine the relation between threshold number and said determined number of physical layer frames, wherein it can be expected that the threshold number represents a slow changing value, while the number of physical layer frames is a fast changing value. It may be noted that the number of physical layer frames may only be recorded within possible values of said threshold number. Is may be sufficient to determine only a property such as 'lager than said threshold number'. Said component for controlling the transmission power of said transmitter may be implemented integrally in said radio interface. Said component for controlling the transmission power can be implemented as a fixed value or for as a relative value power control.

In case that said multi-sub-channel data transmission comprises an (enhanced) dedicated physical data channel and a dedicated physical control channel, said transmission power can be controlled by adjusting the ratio of said enhanced dedicated physical data channel to said dedicated physical control channel.

In an embodiment of the present invention said wireless communication network device comprises all the components of the preceding specification, to enable the device to utilize the advantages provided by the frame repetition procedure as well as the advantages provided by the power control procedure. It is to be noted, that for example the determining the number of physical layer frames to be transmitted in all sub-channels, said first component for determining, if no physical layer frame needs to be transmitted in a provided sub-channel, and said second component for determining, if there is a physical layer frame of another sub-channel with pending acknowledgement may be integrated in a single frame-related component.

Another example embodiment of said wireless communication network device is a mobile user terminal device. The wireless network device can be for example a mobile telephone, a cellular telephone, a communicator a personal digital assistant (PDA). It is also possible to implement the present invention in any kind of other mobile user device that can be connected to a mobile communication system that uses multi-sub-channel FDD HARQ. Especially in the case of a mobile device with the restrictions in regard of transmission power the present scheme using potentially redundant transmissions may seem to waste energy resources. However this 'wasted' energy for a few additional (usually less than the number of channels) frames can result in a more efficient use of the resource bandwidth and the resource data transmission speed which may in the near future represent the more valuable resources.

BRIEF DESCRIPTION OF THE DRAWINGS

In the following, the invention will be described in detail by referring to the enclosed drawings in which.

DETAILED DESCRIPTION OF EMBODIMENTS OF THE INVENTION

The figures show different embodiments with three to five sub-channels. It should be noted that the present invention is not to be restricted to the disclosed numbers of sub-channels depicted in the figures, but can also be applied to any arbitrary number of sub-channels.

Figure 1:
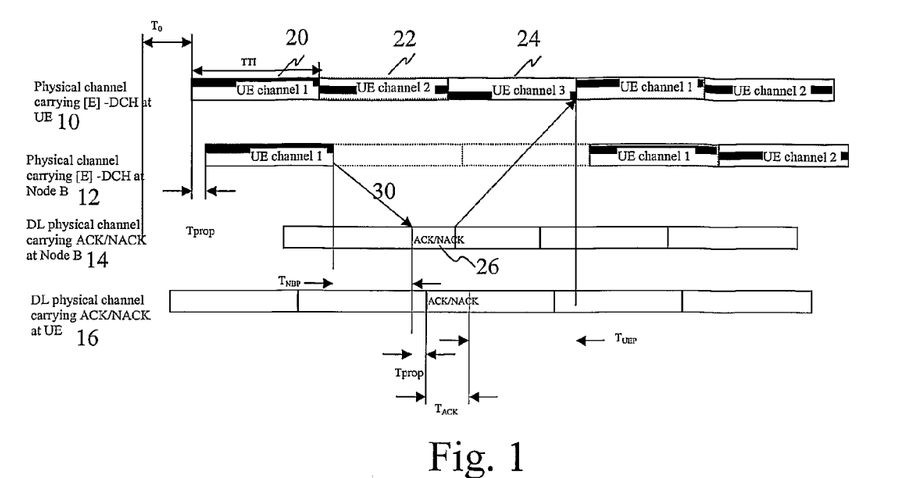
FIG. 1 depicts an example of an N-channel stop-and-wait (SAW) hybrid automatic repeat request (HARQ) with three sub-channels.

FIG. 1 shows an example of an N-channel stop-and-wait (SAW) hybrid automatic repeat request (HARQ) with three sub-channels. The physical layer (PHY) frames 20, 22, 24 are sent in three continuous time-multiplex channels and each of the channels has independent HARQ processing. If any of the PHY frames transmitted in channel 1 is in error, the retransmission occurs only in channel 1.

FIG. 1 depicts the general timing concept for an enhanced dedicated channel (E-DCH) HARQ process. The user equipment (UE) sends transport frames 20, 22, 24 via on the physical channel carrying DCH at user equipment (UE) 10. The base station (Node B) receives said sends transport frames 20, 22, 24 on the physical channel carrying DCH at user equipment at Node B 12 after the time $T_{prop}$ has passed.

After having received transport frames 20, 22, 24 on E-DCH the base station (Node B) has the time $T_{NBP}$ 30 for processing and sending an acknowledgement (ACK) or not-acknowledgement (NACK) 26 to the user equipment (UE) on the downlink (DL) physical channel carrying ACK/NACK at Node B 14. Said acknowledgement (ACK) or not-acknowledgement (NACK) 26 is received at downlink physical channel carrying ACK/NACK at UE 16 after the time $T_{prop}$ has passed.

Here, no assumption is made on which downlink physical channel the ACK/NACK is sent. Based on the ACK and possible other information provided by the universal terrestrial radio access network (UTRAN), the UE decides whether it resends the transport frames(s) or transmits new transport frames(s). The processing time available for the UE between receiving the ACK and transmitting the next frame in the next transmission time interval (TTI) in the same HARQ process is $T_{UEP}$.

The length of the ACK in the downlink (DL) directly affects the available processing time in the Node B and the UE. The length of an ACK field might also affect the required power offset for transmitting it, relative to a downlink dedicated physical control channel (DL DPCCH), depending on the scheme.

Figure 2:
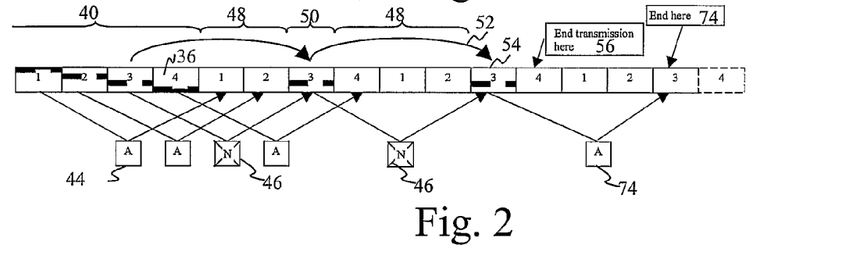
FIG. 2 depicts an example of a retransmission procedure in a conventional N-channel SAW HARQ in the case that one of the last several frames is incorrectly transmitted twice.

FIG. 2 depicts an example of a retransmission procedure using conventional N-channel SAW HARQ in the case that one of the last several frames is transmitted with an error. As shown in FIG. 2 there are four sub-channel provided and therefore the sub-channel number is equal to 4. The transmission 40 would end with the last regular frame 36 in the sub-channel 4, if all frames are acknowledged by an acknowledgment signaling 44. When assuming that the physical layer (PHY) frame is transmitted in sub-channel 3 is error, a not-acknowledgment signaling 46 is transmitted indicating that the error PHY frame must be retransmitted the next time in the third sub-channel 50, as indicated by the arrow 52. Actually there are no PHY frames that need to be transmitted in the first and second sub-channel at the same time also these frames are free or empty frames 48.

Thus, the resources of the first sub-channel and the second sub-channel are wasted. Three additional free or empty sub-channel frames 48 are wasted, if the receiver again unsuccessfully receives the retransmission PHY frame in the third sub-channel. When a small sub-channel number is used, the number of wasted sub-channels will decrease, but the HARQ processing time will also decrease. If the HARQ work at the point of a lower block error rate (BLER) of the first transmission, the error probability of last several frames is down, but the HARQ gaining is lost. The last frame 54 is transmitted in the seventh frame after the last regular frame 36, the transmission it terminated in subsequently 56 and the last acknowledgement 74 is received in the eleventh frame after the last regular frame 36 has been sent.

Figure 3:
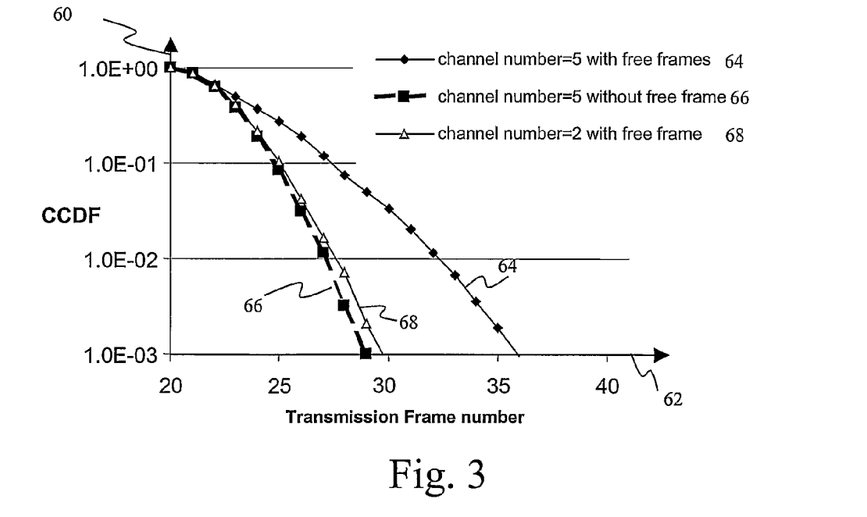
FIG. 3 shows the statistical results of a simulation of the numbers of transmitted frame of a transmission scheme including free frames and excluding free frames in the case of five sub-channels.

FIG. 3 shows the statistical results of a simulation of the numbers of transmitted frame of a transmission scheme including free or empty frames and excluding free frames in the case of five sub-channels and in the case of two sub-channels. In the figure the ordinate 60 represents the complementary cumulative distribution function (CCDF) of transmission frame number, and the abscissa 62 represents the transmission frame number in the case of twenty frames information data transmitted at a block error rate of 0,1.

The result of the transmission frame number including free frames under HARQ by using two sub-channels 68 is marked with triangles. The statistical result of the transmission frame number including free frames under HARQ by using two sub-channels is the criterion to be compared with. The free or empty frames are the frames in the sub-channels that actually transmit nothing. The result of the transmission number statistical performance of five sub-channels by the exclusion of free frames 66 is indicated by the curve marked with the squares. The result of the transmission number statistical performance of five sub-channels with permitted free frames 64 is indicated by the curve marked with rhombs.

From FIG. 3, it can be seen that the transmission number statistical performance of five sub-channels by the exclusion of free frames 66 is better than when five sub-channels are used and free frames are permitted 64. This means that some kind of N-channel SAW HARQ scheme which can eliminate the free frames will have better delay performance than the conventional SAW HARQ scheme using even a small number of sub-channels, such as only two sub-channels 68.

Figure 4A:
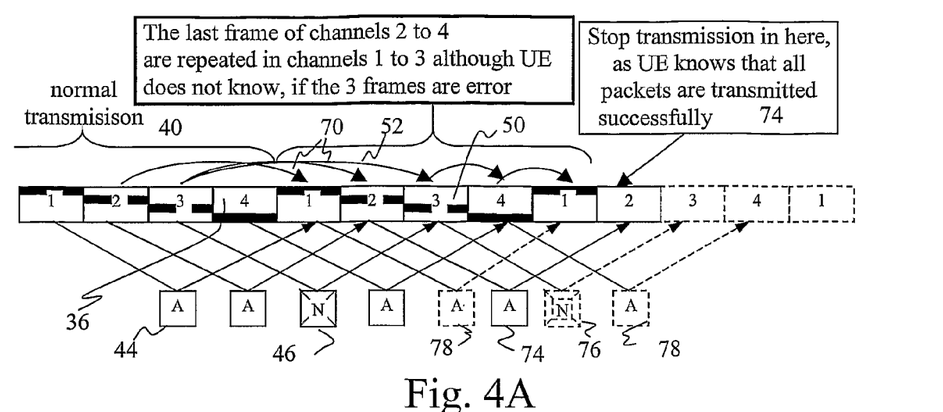
FIGS. 4A to 4C depict methods to repeat the last frames transmitted in different sub-channels.
Figure 4B:
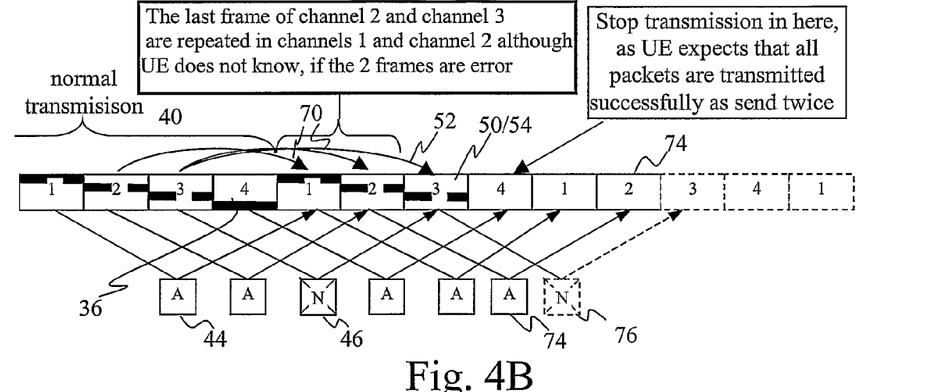
Figure 4C:
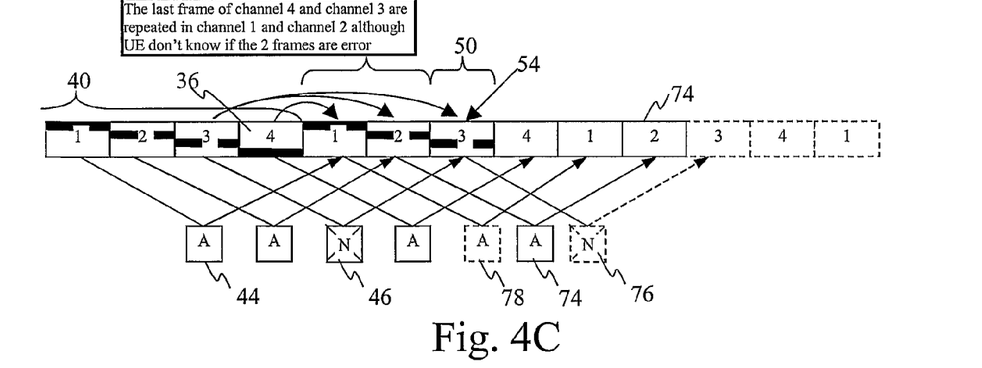

FIG. 4A, FIG. 4B, and FIG. 4C depict methods to repeat the last frames transmitted in different sub-channels.

FIG. 4A shows a method to previously repeat the last frames transmitted in different sub-channels. In FIG. 4A it is assumed that a UE communicates with a Node B under SAW PHY HARQ conditions using four sub-channels. It is further assumed that as in FIG. 2, the last PHY frame 36 of a data packet (RLC SDU) transmission 40 is transmitted in the fourth sub-channel, and the last frame of the third sub-channel is not received successfully by receiver. After sending the last frame of the fourth sub-channel, the UE has nothing to sent in the first sub-channel, since the UE has received the ACK signaling 44 of the first sub-channel, which shows the last frame of the first sub-channel is received successfully by receiver. At the same time, UE has no knowledge of ACK/NACK of the last frames sent in the second, third and fourth sub-channels. The UE will repeat the transmission of the last PHY frames, starting to transmit the frame originally transmitted in the second sub-channel 72, in the first sub-channel as indicated by the arrow 70. After that, the UE receives the ACK signaling of the last frame sent in the second sub-channel, then UE will repeat the last PHY frame which satisfies the condition that the ACK/NACK signaling has not been received by UE. In the figure, the last frame of the third sub-channel will be sent in the second sub-channel. Since the UE has received the NACK signaling 46 of the last frame sent in the third sub-channel, the UE will re-transmit the PHY frame 50 again in the third sub-channel, as indicated by the arrow 52.

The UE has received the ACK signaling of original fourth sub-channel. In the fourth sub-channel, the UE will repeat the last retransmission PHY frame of the third sub-channel again, since the last frame of the third sub-channel is the only PHY frame that of which the UE can not yet determine if received successfully by Node B. The UE has received the ACK of original fourth sub-channel. In fact, the last frame of the third sub-channel has been received correctly in the second sub-channel, although the second retransmission of the third sub-channel 50 is in error again.

In the successive first sub-channel, the UE repeats the last retransmission PHY frame of the third sub-channel again, since the last frame of the third sub-channel is still the only PHY frame that UE has not yet received an ACK signaling, as receiving a redundant or outdated acknowledgement signaling 78 of original second frame from Node B.

In fact, the last frame of the third sub-channel has been received correctly in the second sub-channel and the acknowledgment of the third frame 56 retransmitted in the second sub-channel is acknowledged in successive first sub-channel terminating further retransmissions 56.

The following redundant or outdated acknowledgement signaling 78 and redundant or outdated not-acknowledgement signaling 76 may be discarded.

That is, the acknowledgment of original third frame has been received in the $6^{th}$ sub-channel after the ending of the original message. Compared to the conventional case of FIG. 2, wherein the same information is received in the $13^{th}$ sub-channel after the ending of the original message this represents nearly an acceleration of a factor 2.

The RLC SDU packet has been delivered to high layer by retransmission in the third sub-channel and the Node B will discard the retransmission PHY frames of the third sub-channel and the retransmissions or repetitions in the following sub-channels.

The arrows 70 are provided to indicate frames with similar contents.

FIG. 4B is the method of FIG. 4A with an additional restraint. This restraint limits the retransmissions to a single retransmission. As in FIG. 4A, the UE of FIG. 4B communicates with a Node B under SAW PHY HARQ using four sub-channels. Similarly, the last PHY frame of a data packet (RLC/SDU) is transmitted in the fourth sub-channel 36, wherein the last frame of the third sub-channel is not received successfully by receiver. Similarly, after sending the last frame of the fourth sub-channel 36, the UE has nothing to sent in the successive first sub-channel, since the UE has received the ACK signaling 44 of the first sub-channel, which shows the last frame of the first sub-channel is received successfully by receiver (Node B). But, at the same time, the UE has no knowledge of ACK/NACK of the last frames sent in the second third and fourth sub-channels. The UE will repeat the last transmitted PHY frames, which is starting as in FIG. 4A with the frame originally transmitted in the second sub-channel, in the next first sub-channel. After that, the UE receives the ACK signaling of the last frame sent in the second sub-channel, then the UE repeats the last PHY frames which satisfies both conditions: first: no ACK/NACK signaling has been received by the UE and second: the PHY frame has not been sent more than two times. In the figure, the last frame of the third sub-channel will be sent in the second sub-channel.

Since the UE receives the NACK signaling 46 of the last frame sent in the third sub-channel, the UE will again retransmit the PHY frame again in the third sub-channel 50/54.

In the fourth sub-channel, the UE receives the acknowledgement of original fourth frame, and will not repeat the last retransmission PHY frame of the third sub-channel again, since the last frame of the third sub-channel has already been repeated or retransmitted.

After that, there are no frames left which satisfies the two conditions: ACK/NACK signaling has not been received by UE and the PHY frame has not been send more than two times.

That is, the last acknowledgment of original third frame is received in the $6^{th}$ sub-channel 74 after the ending of the original message. The last frame has been sent in the third sub-channel 54 after the ending of the original message. Compared to the cases of FIG. 2, wherein the last transmission is performed in the $6^{th}$ or the $5^{th}$ frame after the original end of the message, this represents an advantage.

FIG. 4 C is the method to previously repeat the last frames transmitted in different sub-channels in an inverted succession. As already shown in FIGS. 4A and 4B, it is assumed in FIG. 4C that the UE communicates with a Node B under SAW PHY HARQ using four sub-channels. Similarly, the last PHY frame of a data packet (RLC SDU) transmission is transmitted in the fourth sub-channel 36, and the last frame of the third sub-channel is not received successfully by Node B. After sending the last frame of the fourth sub-channel 36, the UE has nothing to sent in the first sub-channel, since the UE has received the ACK signaling of the first sub-channel frame, which shows that the last frame of the first sub-channel is received successfully by receiver. But, at the same time, the UE has no knowledge of ACK/NACK of the last frames sent in the second third and fourth sub-channels. The UE repeats the last transmitted PHY frame, which is the frame transmitted in the fourth sub-channel, in the actual first sub-channel, as indicated by the arrow. After that, the UE receives the ACK signaling 44 of the last frame sent in the second sub-channel. Following that, the UE repeats the last PHY frame, which satisfies both conditions below: first the ACK/NACK signaling has not been received by the UE and second the PHY frame has not been repeated. In the figure, the last frame of the third sub-channel will be sent in the second sub-channel.

Since the UE receives the NACK signaling 46 of the last frame sent in the third sub-channel, the UE retransmits the PHY frame again in the third sub-channel. In the fourth sub-channel, the UE repeats the last retransmission PHY frame of the third sub-channel again, since the last frame of the third sub-channel is the only PHY frame that is still without acknowledgement. In fact, the last frame of the third sub-channel has been received correctly in the second sub-channel, although the retransmission of the third sub-channel filed again. The data packet (RLC SDU) has been delivered to higher layer by retransmission in the second sub-channel and Node B will discard the retransmission PHY frames of the third sub-channel and it is repetitions in the fourth sub-channel.

By the method described above, the last PHY frames which the UE has not yet received ACK/NACK signaling and can not decide if they are received or in error will be repeated once previously. If the block error rate (BLER) of the first transmission is 10%, the combined BLER of the PHY frame and the repeated PHY frame is 1%. As a result, the BLER of the last several PHY frames is much lower than the BLER of the previous other PHY frames. For the repeating PHY frame, the new data indicator will show that the PHY frame is a retransmission frame, and the media access (MAC) layer will judge the repeating PHY frame belong to which sub-channel by the transmission sequence number.

Figure 5:
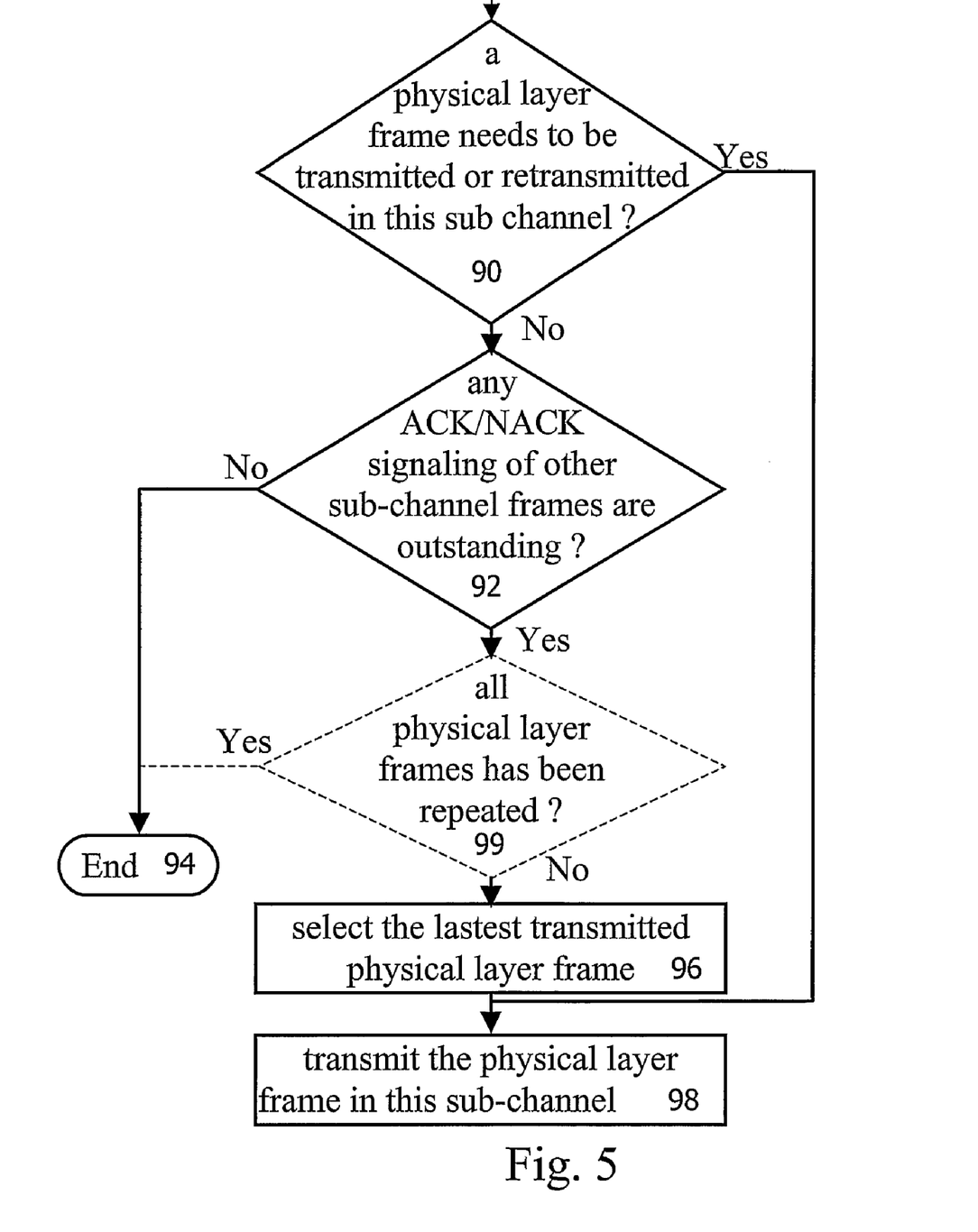
FIG. 5 shows a flow chart of the method for repeating the last frames of the last sub-channels, FIGS. 6A to 6C visualize methods to increasing the transmitting power of the last frames sent in the sub-channels.

The FIG. 5 is a flow chart of the method for repeating the last frames of the last sub-channels. The flowchart starts with an interrogation 90, if a physical layer (PHY) frame is present that needs to be transmitted or retransmitted in a provided sub-channel. If there are any PHY frame to be transmitted, the flowchart jumps to the transmission field 98, and transmits the present PHY frame in a conventional manner.

If there is no PHY frame to be transmitted, the flowchart jumps to the next interrogation field 92, to determine, if there is an acknowledgement/not-acknowledgement (ACK/NACK) signaling of other sub-channel frames outstanding or pending.

If there is no ACK/NACK signaling of other sub-channel frames outstanding or pending, the method is terminated in the End-frame 94.

If there is at least one transmission with pending or outstanding ACK/NACK signaling of other sub-channel frames outstanding or pending, one of said at least one transmission is selected 96 and in the following transmitted 98 as the selected PHY frame. I.e. the method repeats the last transmission PHY frames, for the frames the device has not yet received an acknowledgement.

In the figure there is an additional interrogation element 99 depicted that is not compulsive and therefore depicted in interrupted lines. The interrogation is inserted to determine if the physical layer frame has been repeated or not. This interrogation can be used to guarantee that none of the remaining frames is more often re-transmitted than one of the others.

If all frames have already been repeated the method can be terminated in the end-box 94.

If there are still non-repeated frames, one of these frames can be selected for transmission. Thereby, none of the frames receives a preferential treatment, preventing a decrease of the overall performance.

Figure 6A:
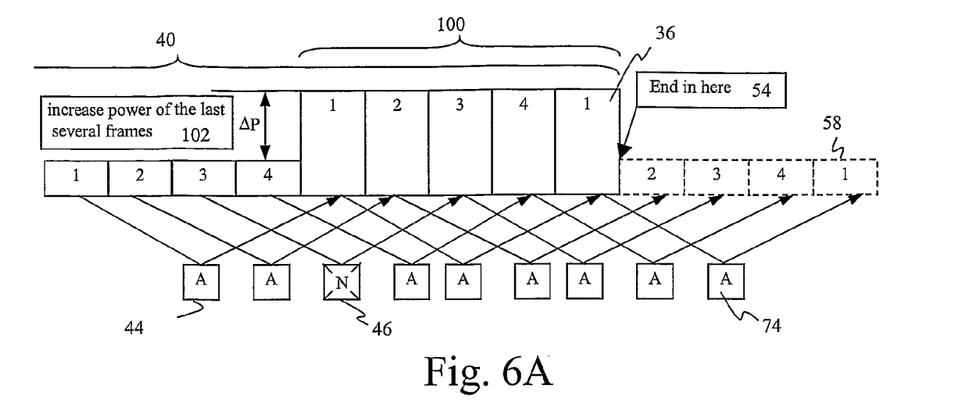
Figure 6B:
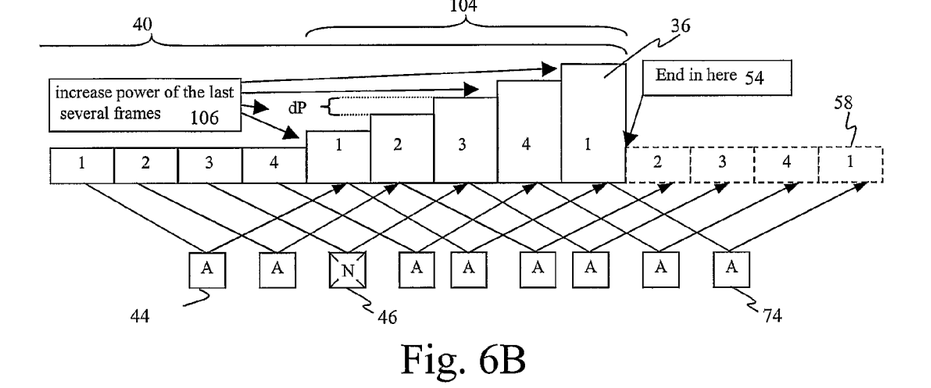
Figure 6C:
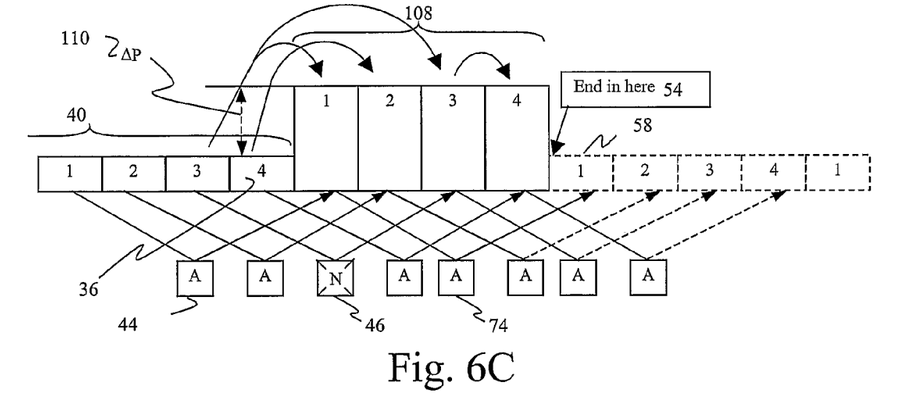

FIGS. 6A to 6C visualize methods to increasing the transmitting power of the last frames sent in the sub-channels.

FIG. 6A shows a method to increase the transmitting power of the last frames 100 sent in the sub-channels during the transmission of a data packet 40 with a multitude of frames, according to one aspect of the present invention. Firstly, the radio link control (RLC) layer of the user equipment (UE) must inform the media access control (MAC) layer by the primitives between MAC and RLC when the number of the physical layer (PHY) frames are to be sent is equal to a determined threshold number (here the sub-channel number N). In other words, when the last N PHY frames need to be transmitted 100.

Then, the MAC layer informs the physical layer to increase the transmitting power for the PHY frames 100, which is shown by adding an additional power $\Delta P$ 102 to the current transmitting power according system configuration. The last blocks are transmitted with an increased transmission power starting with a block of first sub-channel. The block error rate (BLER) of the PHY frames 100 transmitted with increased power is much lower than the BLER of PHY frames transmitted with normal transmission power. Although, in this example the last four frames should have be transmitted with an increased power, the reception of a not-acknowledgement in the third sub-channel frame extends the transmission period with increased power by one sub-channel frame to an overall of five 'high power' frames. In this configuration the last transmitted frame was a last regular frame 36.

When the last PHY frame of a data packet (RLC SDU) is transmitted, the transmitting power will be adjusted downwards by the amount of $\Delta P$ again. The transmission is terminated after the frame 36, and the last ACK is received in First sub-channel frame with the reference sign 56.

In FIG. 6B the transmission power of the last few sub-channel frames 104 of a transmission 40 is increased incrementally each by a small amount dP 106. Thereby, the transmission power increased in small steps leading to an evaluation of the increasing importance of the last transmissions. If the first frame of the bracket 104 is transferred incorrectly it would be repeated behind the last frame, extending the present transmission for a single frame. If the last transmitted frame 36 would be in error, a conventional retransmission would be performed in the same sub-channel, extending the transmission by N sub-channel frames. That is, the closer a transmissions of a frame is performed to the end of a transmission, the longer an incorrect transmission will extend the transmission time. Therefore, an incremental increasing of the transmission power of the last few frames would consider the different importance of the last few frames.

It is possible to increase the transmission power for the last N−1 frames, as a repetition of the first frame would nearly do no harm. It is also possible to use the last N frames with an increased transmission power to circumvent a possible retransmission of the first frame. It is also possible to select the last N+1, the last N+2 to the last 2N frames for a transmission with increased power.

It is also possible to combine the methods depicted in the FIGS. 6A and 6B with one of the methods of the FIGS. 4A to 4C. Thereby, the last frames of a transmission can be repeated with or without increased power, wherein the retransmissions of FIGS. 4A to 4C are simply attached behind the transmission of the last regular frame in the bracket 40.

The FIG. 6C depicts another possible combination of the two methods of the present invention wherein the transmission power only of the frames is increased that are repeated according to the method the FIGS. 4A to 4C, i.e. the retransmissions of the frames with outstanding acknowledgement signaling 108. In the figure the transmission power of the retransmitted frames with outstanding acknowledgement signaling 108 is increased by a constant additional power ΔP 110. The frames 108 are transmitted after the last regular frame 36 of the transmission 40 has been sent.

Figure 7:
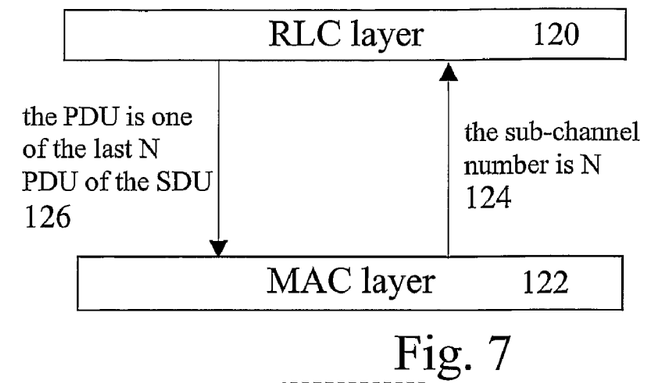
FIG. 7 represents new primitives that can be added between radio link control (RLC) layer and the media access control (MAC) layer for the method of FIG. 5.

FIG. 7 represents new primitives that can be added between radio link control (RLC) layer and the media access control (MAC) layer for the method of FIG. 6. The new primitives are based on the transfer of information between the radio link control (RLC) layer 120 and the media access control (MAC) layer 122 of a transmission device. The RLC requires the number of actually used sub-channels 124 to decide, if an actual frame is to be regarded as one of the last frames of a running transmission. The RLC layer has to inform 126 the MAC layer if, and when one of the last frames of a running transmission is to be regarded as one of the last frames and that the transmission power is to be increased, for the next frames.

Figure 8:
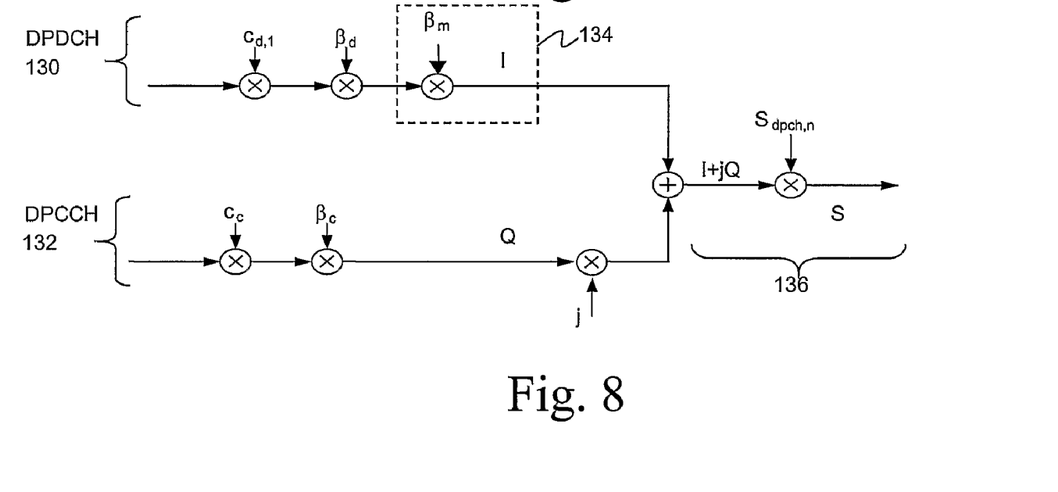
FIG. 8 depicts a channel structure modified for the method of FIG. 5 to increase the transmitting power of the last frame sent in the different sub-channels.

FIG. 8 depicts a channel structure that is modified for the method of FIG. 5 to increase the transmitting power of the last frame sent in the different sub-channels. An additional power adjustment factor $\beta_m$ 134 is added to the channel structure, and is indicated by the box with the interrupted lining. If the condition of the power addition is satisfied, the $\beta_m$ is set to the valued configured by system. If the condition of the power addition is not satisfied, the $\beta_m$ has a '1'-value and the conventional power control structure with independent transmission power control stages for dedicated physical data channels (DPDCH) 130 and dedicated physical control channel (DPCCH) 132 is employed in a conventional manner. The reference sign 136 represents an alternative location to insert the additional power adjustment factor $\beta_m$ 134.

Figure 9:
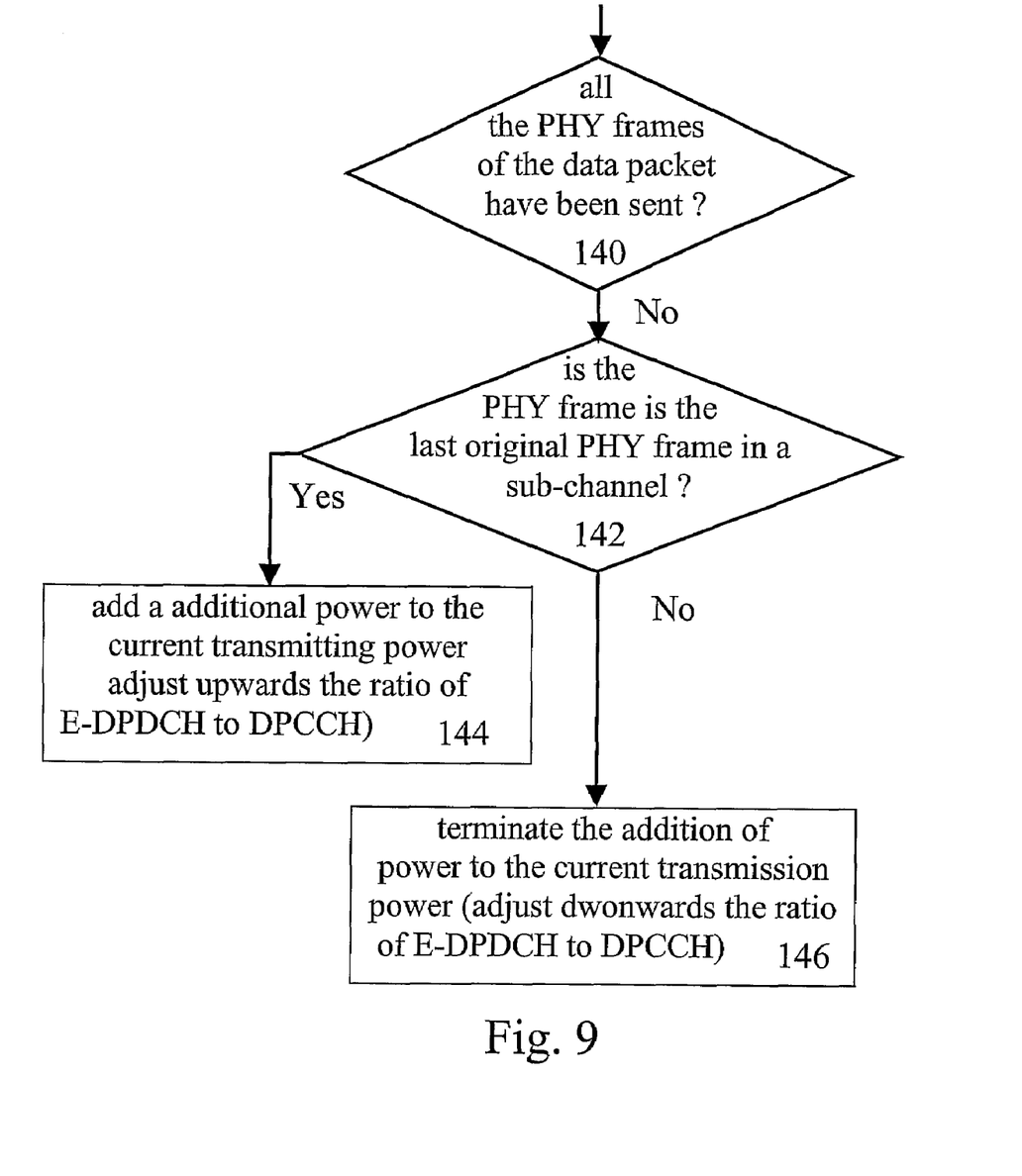
FIG. 9 shows a flowchart of the method of FIG. 5 to increase the transmitting power of the last frame sent in the different sub-channels repeating the last frames of the last sub-channels.

FIG. 9 shows a flowchart of the method of FIG. 5 to increase the transmitting power of the last frame sent in the different sub-channels repeating the last frames of the last sub-channels.

The flowchart starts with an interrogation 140 to determine, if all the physical layer (PHY) frames of a data packet have been sent. If this is not the case, a next interrogation 142 is performed to determine if the actual PHY frame is the last (original) PHY frame to be transmitted in a present sub-channel.

If the actual PHY frame is the last (original) PHY frame to be transmitted in a present sub-channel, the actual transmission power is increased 144 by adding additional transmission power. This can be performed for example by adjusting upwards the ratio of the transmission power of an enhanced dedicated physical data channel (E-DPDCH) to the transmission power of a dedicated physical control channel (DPCCH).

If the actual PHY frame is not the last (original) PHY frame to be transmitted in a present sub-channel, the addition of power to the current transmission power can be terminated 146. Adjusting downwards the ratio of the transmission powers of the E-DPDCH to the DPCCH can do this.

By the expression original is set in parenthesis to indicate that the present method can be combined with the method of FIG. 4, wherein the retransmissions can also be performed with an increased transmission power. When ignoring the parenthesis only the original frames are transmitted with an increased power and the retransmissions are performed with a standard transmission power, to protect power resources.

Figure 10:
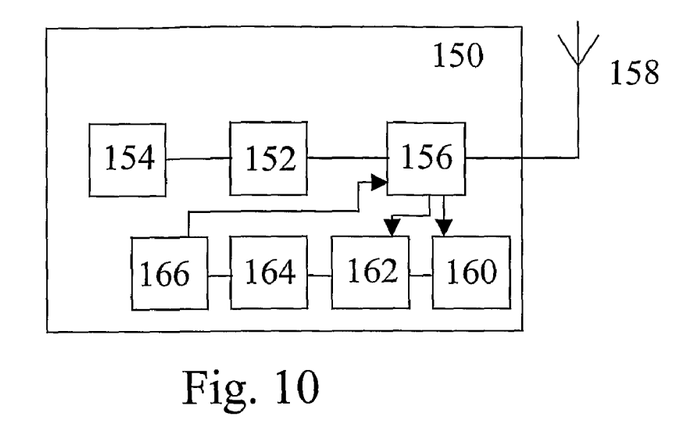
FIGS. 10 to 12 depict different embodiments of wireless communication network devices capable of decreased transmission delay.
Figure 11:
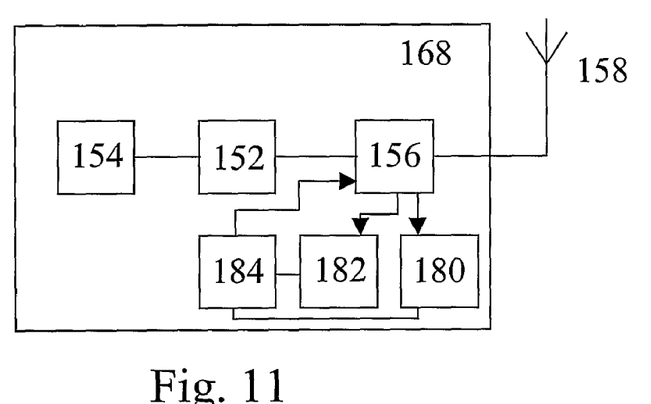
Figure 12:
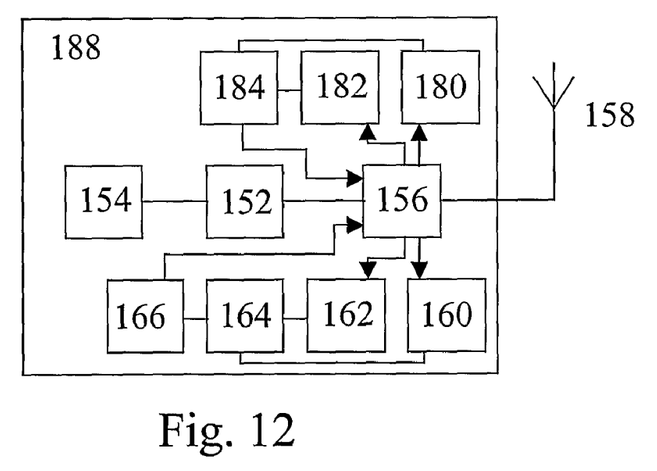

FIGS. 10 to 12 depict different embodiments of wireless communication network devices capable of decreased transmission delay.

FIG. 10 shows an embodiment of a wireless communication network device capable of decreased transmission delay according to one of the FIGS. 4A to 4C. Wireless communication network device comprises: a processing unit 152, a storage 154, connected to said processing unit 152, and a radio interface 156 connected to said processing unit 152. The radio interface 156 is provided to perform said multi-sub-channel data communication of physical layer frames using hybrid automated repeat request. The radio interface 156 comprises a radio interface which in turn comprises a transmitter and a receiver (not depicted) and that is connected to an antenna 158.

The wireless communication network device further comprises a first component for determining 160, if no physical layer frame needs to be transmitted in a provided sub-channel, wherein said first component is connected to said radio interface said 156 to be able to perform this determination.

The wireless communication network device 150 further comprises a second component for determining 162, if there is a physical layer frame of another sub-channel with pending acknowledgement. The second component 162 can be connected to said first component 160 to perform the determination only in case that actually a free frame is detected. It is also possible permanently determine if there are frames with pending acknowledgement present.

The wireless communication network device further comprises a third component for selecting 164, a physical layer frame with pending acknowledgement, if no physical layer frame needs to be transmitted in a provided sub-channel. The third component 164 is at least connected to said second component 162, and directly or indirectly to said first component 160.

A fourth component for transmitting 166 said selected frame in said provided sub-channel is connected to said third component and to said radio interface 156.

The selection algorithm or the dedicated selection logic is provided in the third component for selecting 164. So a different implementation of component 164 decides which of said methods depicted in the FIGS. 4A to 4C is actually performed.

FIG. 11 shows an embodiment of a wireless communication network device capable of decreased transmission delay according to one of the FIGS. 6A and 6B. As in FIG. 10 the wireless communication network device comprises: a processing unit 152, a storage 154, connected to said processing unit 152, and a radio interface 156 that is connected to said processing unit 152 and to an antenna 158.

The wireless communication network device further comprises a component for determining a threshold number 180, based on the number of sub-channels in said multi-sub-channel data transmission, performed by said radio interface 156. Therefore, said component for determining said threshold number 180 is connected to said radio interface 156. It is also possible to base said determination of said threshold number also on other parameters such as e.g. an actual signal to noise ratio, a determined block error rate or a frame error rate, or other data derivable e.g. from a HARQ process used in the transmission.

The wireless communication network device further comprises a component for determining the number of physical layer frames to be transmitted 182 in all sub-channels. Said component for determining said number of physical layer frames 182 is connected to said radio interface 156.

In FIG. 11 the component for determining a threshold number 180 and the component for determining the number of physical layer frames to be transmitted 182 are both connected to a component for controlling the transmission power 184. The component for controlling the transmission power 184 is connected to a transmitter in said radio interface 156 to control the transmission power of physical frames are transmitted with, depending on an actual relationship between said threshold number and said determined number of physical layer frames.

It is possible to relate the control characteristics of said transmission power to other parameters such as e.g. an actual signal to noise ratio, a determined block error rate or a frame error rate, or other data derivable e.g. from a HARQ process used in the transmission.

FIG. 12 shows an embodiment of a wireless communication network device capable of decreased transmission delay according to FIG. 6C. The wireless communication network device comprises the elements of the devices of FIGS. 10 and 11. For simplicity the depicted embodiment represents combination of FIGS. 10 and 11, the depicted embodiment is therefore capable to perform all combinations of the method of FIGS. 4A to 4C and 6A, 6B.

It is also possible to implement the components 160 and 182 in single element as both of these two components are based on the number of physical layer frames to be transmitted. In contrast to FIG. 10 the components 160 and 164 are directly connected.

The present invention can be simply implemented by changing the transceiver part of a communication equipment without a necessity to change the receiver in any way. The transmitting part of the present invention can be operated with a conventional receiver part providing a continuous receiving and acknowledging procedure.

The present invention can decrease probability of wasted time, and hence can decrease the probability of information frames with longer delay and increase the system throughput. The methods of the are both simple and can be implemented easily.

As the method only affects the last several frames may add interference to system only for a short time compared to the overall transmission time. The method of repeating the last several frames in the free sub-channel may waste some system power resource to transmit potentially useless frames.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. Method for decreasing a transmission delay in a multi-sub-channel data transmission of physical layer frames using hybrid automated repeat request with acknowledgement signaling, wherein said method comprises:

determining, if no physical layer frame needs to be transmitted in a provided sub-channel, determining, if there is a physical layer frame of another sub-channel with pending acknowledgement, selecting said physical layer frame with pending acknowledgement, if no physical layer frame needs to be transmitted in the provided sub-channel, transmitting said selected frame in said provided sub-channel, determining a threshold number, based on the number of sub-channels in said multi-sub-channel data transmission, determining the number of physical layer frames to be transmitted in all sub-channels, and controlling the transmission power of the transmission of the physical layer frames, on the basis of the relationship between said threshold number and said determined number of physical layer frames.

2. Method according to claim 1, wherein said controlling of the transmission power comprises:

increasing the transmission power for the transmission of the physical layer frames, if said threshold number exceeds said determined number of physical layer frames to be transmitted.

3. Method according to claim 2, further comprising determining an error rate, and wherein said determining of said threshold number, is also based on said determined error rate.

4. Method according to claim 1, further comprising determining an error rate, and wherein said determining of said threshold number, is also based on said determined error rate.

5. Method according to claim 4, wherein said controlling of said transmission power, is also related to said determined error rate.

6. Method according to claim 5, wherein said controlling of the transmission power comprises decreasing the transmission power, if said determined number of physical layer frames to be transmitted exceeds said threshold number.

7. Method according to claim 1, wherein said controlling of the transmission power comprises:

decreasing the transmission power, if said determined number of physical layer frames to be transmitted exceeds said threshold number.

8. Method according to claim 1, wherein said multi-sub-channel data transmission is an uplink of a dedicated transport channel in universal terrestrial radio access.

9. Wireless communication network device capable of decreased transmission delay in a multi-sub-channel data transmission of physical layer frames using hybrid automated repeat request with acknowledgement signaling, wherein said network device comprises:

a processing unit, a storage, connected to said processing unit, a radio interface for said multi-sub-channel data transmission of physical layer frames using hybrid automated repeat request, wherein said radio interface is connected to said processing unit and to said storage, and wherein said radio interface comprises a transmitter and a receiver, a first component for determining, if no physical layer frame needs to be transmitted in a provided sub-channel, a second component for determining, if there is a physical layer frame of another sub-channel with pending acknowledgement, a third component for selecting, said physical layer frame with pending acknowledgement, if no physical layer frame needs to be transmitted in the provided sub-channel, and a fourth component for transmitting said selected frame in said provided sub-channel, wherein said first component said second component said third component and said fourth component are each connected to said radio interface, and wherein said first component is connected to said second component, said second component is connected to said third component, and said third component is connected to said fourth component.

10. Wireless communication network device according to claim 9, further comprising:

a component for determining a threshold number, based on the number of sub-channels in said multi-sub-channel data transmission, wherein said component for determining said threshold number is connected to said radio interface;

a component for determining the number of physical layer frames to be transmitted in all sub-channels, wherein said component for determining said number of physical layer frames is connected to said radio interface, and a component for controlling the transmission power of said transmitter for the transmission of the physical layer frames, in dependence of the relationship between said threshold number and said determined number of physical layer frames, wherein said component for controlling is connected to both of said components for determining and to said radio interface.

11. Wireless communication network device according to claim 10, wherein said network device is a mobile user terminal device.

12. Wireless communication network device according to claim 9, wherein said network device comprises a mobile user terminal device.

13. A computer readable medium storing a computer program having instructions for executing a computer process, the process comprising:

determining, if no physical layer frame needs to be transmitted in a provided sub-channel, determining, if there is a physical layer frame of another sub-channel with pending acknowledgement, selecting said physical layer frame with pending acknowledgement, if no physical layer frame needs to be transmitted in the provided sub-channel, transmitting said selected frame in said provided sub-channel, determining a threshold number, based on the number of sub-channels in said multi-sub-channel data transmission, determining the number of physical layer frames to be transmitted in all sub-channels, and controlling the transmission power of the transmission of the physical layer frames, on the basis of the relationship between said threshold number and said determined number of physical layer frames.

* * * * *